(12) United States Patent
Meretab

(10) Patent No.: US 10,423,697 B2
(45) Date of Patent: *Sep. 24, 2019

(54) USER INTERFACE WITH NAVIGATION CONTROLS FOR THE DISPLAY OR CONCEALMENT OF ADJACENT CONTENT

(71) Applicant: MCAP RESEARCH LLC, Wilmington, DE (US)

(72) Inventor: Efrem Meretab, West Chester, PA (US)

(73) Assignee: MCAP RESEARCH LLC, Wilmington, DE (US)

( * ) Notice: Subject to any disclaimer, the term of this patent is extended or adjusted under 35 U.S.C. 154(b) by 415 days.

This patent is subject to a terminal disclaimer.

(21) Appl. No.: 15/450,457

(22) Filed: Mar. 6, 2017

(65) Prior Publication Data
US 2017/0192938 A1    Jul. 6, 2017

Related U.S. Application Data

(63) Continuation of application No. 12/839,131, filed on Jul. 19, 2010, now Pat. No. 9,626,339.

(60) Provisional application No. 61/271,394, filed on Jul. 20, 2009.

(51) Int. Cl.
| | | |
|---|---|---|
| G06F 16/338 | (2019.01) | |
| G06F 16/954 | (2019.01) | |
| G06F 17/21 | (2006.01) | |
| G06F 17/22 | (2006.01) | |
| G06F 3/0481 | (2013.01) | |

(52) U.S. Cl.
CPC .......... *G06F 17/211* (2013.01); *G06F 3/0481* (2013.01); *G06F 16/338* (2019.01); *G06F 16/954* (2019.01); *G06F 17/2229* (2013.01)

(58) Field of Classification Search
CPC .... G06F 17/211; G06F 16/954; G06F 16/338; G06F 3/0481; G06F 17/2229
See application file for complete search history.

(56) References Cited

U.S. PATENT DOCUMENTS

| | | |
|---|---|---|
| 5,241,671 A | 8/1993 | Reed et al. |
| 5,351,189 A | 9/1994 | Doi et al. |
| 6,915,300 B1 | 7/2005 | Roux et al. |
| 6,924,828 B1 | 8/2005 | Hirsch |
| 7,085,778 B2 | 8/2006 | Reed et al. |

(Continued)

OTHER PUBLICATIONS

International Search Report and Written Opinion dated Sep. 7, 2010 for International Application No. PCT/US2010/042601.

(Continued)

*Primary Examiner* — Jorge A Casanova
(74) *Attorney, Agent, or Firm* — K&L Gates LLP

(57) ABSTRACT

A computerized system including a graphical interface is provided for storing, retrieving, and displaying individual sentences or subunits of a data source as stand-alone entities, independent of how they are ordered within the source document. The graphical user interface provides an interactive display that allows a user to dynamically develop his or her own context for displayed document subunits, such as sentences, by means of incremental displays of surrounding material or of material related by other relations or criteria, so that relevant sentences or subunits from a single source or different sources can be retrieved, aggregated, compared, and displayed along with context specifically tailored for each user-relevant sentence or subunit as appropriate.

8 Claims, 20 Drawing Sheets

(56) References Cited

U.S. PATENT DOCUMENTS

| | | |
|---|---|---|
| 7,287,221 B2 | 10/2007 | Bodin et al. |
| 7,315,867 B2 | 1/2008 | Kobayashi et al. |
| 7,664,773 B2 | 2/2010 | Hattori et al. |
| 7,664,774 B2 | 2/2010 | Reed et al. |
| 7,779,003 B2 | 8/2010 | McKnight |
| 7,802,184 B1 | 9/2010 | Battilana |
| 8,229,971 B2 | 7/2012 | Meretab |
| 8,280,878 B2 | 10/2012 | Warnock |
| 8,990,218 B2 | 3/2015 | Meretab |
| 2002/0128814 A1 | 9/2002 | Brandon et al. |
| 2003/0172353 A1 | 9/2003 | Cragun |
| 2004/0098262 A1 | 5/2004 | Philbert |
| 2004/0176954 A1 | 9/2004 | Wang |
| 2005/0185225 A1 | 8/2005 | Brawn et al. |
| 2006/0106783 A1 | 5/2006 | Saffer et al. |
| 2007/0211071 A1 | 9/2007 | Slotznick et al. |
| 2007/0219933 A1 | 9/2007 | Datig |
| 2007/0239662 A1 | 10/2007 | Fontes et al. |
| 2008/0148147 A1 | 6/2008 | Poston et al. |
| 2008/0228490 A1 | 9/2008 | Fischer et al. |
| 2009/0083027 A1 | 3/2009 | Hollingsworth |
| 2010/0174544 A1 | 7/2010 | Heifets |
| 2012/0265763 A1 | 10/2012 | Meretab |
| 2014/0035920 A1 | 2/2014 | Duwenhorst |

OTHER PUBLICATIONS

Wang, Haoyi and Yang Huang, "Bondec—a Sentence Boundary Detector", published 2003, printed from nlp.stanford.edu.courses/cs224n/2003/fp/huangy/final_project.doc, 9 pages.

Walker et al., "Sentence Boundary Detection: A Comparison of Paradigms for Improving MT Quality", printed from https://www.mt-archive.info/MTS-2001-Walker.pdf, 2001, 4 pages.

Reynar, Jeffrey C. and Adwait Ratnaparkhi, "A Maximum Entropy Approach to Identifying Sentence Boundaries", Computing Research Repository, printed from http://www.aclweb.org/a.

E. Bier et al., "A Document Corpus Browser for In-Depth Reading", JCDL '04, Tucson, AZ, 2004, pp. 87-96.

L. Good et al., "UC: A Fluid Interface for Personal Digital Libraries", JCDL '05, Denver, CO, 2005, 10 pages.

Palmer, David D. and Marti A. Hearst, "Adaptive Sentence Boundary Disambiguation", UC Berkeley Computer Science Technical Report No. UCB/CSD-94/797, Feb. 1994, Computer Sc.

Lepro, Sara and Tim Paradis, "Stocks Rally Anew on More Signs of Economic Health", printed from http://finance.yahoo.com/news/Stocks-rally-anew-on-more-apf-791335492.html?x=0, Date: Jun. 20, 2009.

Stocks rally anew on more signs of economic health

Wall Street extends rally as economic data, solid earnings lift investors' spirits

- By Sara Lepro and Tim Paradis, AP Business Writers
- On Monday July 20, 2009, 5:58 pm EDT                    220

NEW YORK (AP) - [1] Investors are taking the numbers and running with them. [2] Stocks — 222
jumped again Monday, giving the Dow Jones industrials their sixth straight advance, as investors got more robust earnings news from big companies and data that suggests the economy is closer to a recovery. [3] News that CIT had struck a financing deal that will keep the troubled — 224
commercial lender out of bankruptcy also drove the market higher.

[4] A 100-point gain pushed the Dow back into the black for the year, while the Standard & — 226
Poor's 500 climbed to its highest finish since November.

[5] CIT Group Inc.'s deal with bondholders stoked the market's growing sense of optimism, — 225
which got a big boost last week from a string of good earnings news. [6] The company's future — 228
was cast in doubt after negotiations with federal regulators for bailout funds fell through. Its failure would have been a blow to investor confidence and would have hurt industries like
230 — retailing, which has suppliers who rely on CIT for financing.

[7] The market also got a stream of news that bolstered the argument that the economy is in fact heading for a recovery. — 232

234 — [8] A surprisingly large rise in a predictor of future economic activity also supported stocks. [9] The Conference Board's index of leading economic indicators rose 0.7 percent in June, more than the 0.4 percent forecast. [10] It was the third straight month of gains. — 236

238 — [11] Market indicators jumped about 7 percent last week following a month long slide driven by discouraging reports on the economy. [12] Solid earnings and outlooks from leading companies including Goldman Sachs Group Inc., Intel Corp. and International Business Machines Corp. gave investors hope that the worst of the recession could be past. — 240

MCAP RESEARCH | Log out

[Buffer] [Fulltexts] [My Stocks] [Extractions] [Transcripts] [Brokers] [Analysts] [Stocks] [Options] [Users Log]

Intersil (ISIL)

(dividend) [Search] [Clear] (choose query) [▼] [Delete Global Query]
☐ Search within results
Matched Reports: 2/2   Matched Sentences: 10/1575   [Fold Results]   [Change Ticker]   [Print]   [Email]

Search Results

☑ Matched Documents

| ☑ | 04/22/09 | ISIL | Q1 2009 Intersil Corporation Earnings Conference Call Apr 22, 2009 / 08:45PM GMT | FINAL | 📄 ▼ |

We remain very confident in our unique business model and as a result the board of directors has authorized a quarterly dividend of $0.12 per share of common stock. At our current stock price this results in a dividends yield of nearly 4%.

— 400

We paid out approximately $14.6 million in dividends in the first quarter and we did not repurchase shares during Q1 and we do not have an active program at this time.

| ☑ | 01/28/09 | ISIL | Q4 2008 Intersil Corporation Earnings Conference Call Jan 28, 2009 / 09:45PM GMT | FINAL | 📄 |

☐ Not Matched Documents

☐ Excluded Documents

| ☐ | 04/16/08 | ISIL | Q1 2008 Intersil Corporation Earnings Conference Call Apr 16, 2008 / 08:45PM GMT | FINAL | 📄 |
| ☐ | 10/22/08 | ISIL | Q3 2008 Intersil Corporation Earnings Conference Call Oct 22, 2008 / 08:45PM GMT | FINAL | 📄 |
| ☐ | 07/23/08 | ISIL | Q2 2008 Intersil Corporation Earnings Conference Call Jul 23, 2008 / 08:45PM GMT | FINAL | 📄 |

© 2009 MCAP RESEARCH. All Rights Reserved.

| MCAP RESEARCH | | | | | | | Log out |
|---|---|---|---|---|---|---|---|
| Buffer | Fulltexts | My Stocks | Extractions | Transcripts | Brokers | Analysis | Stocks | Options | Users Log |

Intersil (ISIL)

| (repurchase) | | Search | Clear | (choose query) ▾ | Save Query |
|---|---|---|---|---|---|
| ☐ Search within results | | | | | |
| Matched Reports: 2/2 | Matched Sentences: 4/1575 | Fold Results | | Change Ticker | Print | Email |

Search Results

☑ Matched Documents

| ☑ 04/22/09 | ISIL | Q1 2009 Intersil Corporation Earnings Conference Call Apr 22, 2009 / 08:45PM GMT | FINAL ▾ |

We paid out approximately $14.6 million in dividends in the first quarter and we did not repurchase shares during Q1 and we do not have an active program at this time.

| ☑ 01/28/09 | ISIL | Q4 2008 Intersil Corporation Earnings Conference Call Jan 28, 2009 / 08:45PM GMT | FINAL ▾ |

During the quarter, the Company repurchased approximately $15 million or 1.3 million shares of our stock and paid approximately $15 million in dividends.

502 504 506 508
500

☑ Not Matched Documents

☐ Excluded Documents

| ☐ 10/22/08 | ISIL | Q3 2008 Intersil Corporation Earnings Conference Call Oct 22, 2008 / 08:45PM GMT | FINAL |
| ☐ 07/23/08 | ISIL | Q2 2008 Intersil Corporation Earnings Conference Call Jul 23, 2008 / 08:45PM GMT | FINAL |
| ☐ 04/16/08 | ISIL | Q1 2008 Intersil Corporation Earnings Conference Call Apr 16, 2008 / 08:45PM GMT | FINAL |

© 2009 MCAP RESEARCH, All Rights Reserved

```
JavaScript/Ajax Code
function addSentenceToPage(sentenceID, operation) {
  //get ID for new sentence
  var newSentenceID;
  if (operation == 'prev')
    newSentenceID = getPreviousSentenceID(sentenceID);
  else
    newSentenceID = getNextSentenceID(sentenceID);
    //get sentence-data from server by AJAX
  var sentence = getExactSentenceAJAX(newSentenceID);
  //if it was fail - return false
  if (!sentence) return false;
    //add new sentence to page
  insertSentence(sentence);
    // remove listener for event "click"
  removeListenerForSentence(sentenceID, operation);
  //remove points
  removePoints(newSentenceID);
  //check near sentences
  if ( !isNearSentenceLeft(newSentenceID))
    addPointsLeft(newSentenceID);
  if ( !isNearSentenceRight(NewSentenceID))
    addPointsRight(newSentenceID);
}
```

FIG. 17

USER INTERFACE WITH NAVIGATION CONTROLS FOR THE DISPLAY OR CONCEALMENT OF ADJACENT CONTENT

CROSS-REFERENCE TO RELATED APPLICATIONS/PRIORITY CLAIM

This application is a continuation application claiming priority under 35 U.S.C. § 120, to U.S. patent application Ser. No. 12/839,131, entitled USER INTERFACE WITH NAVIGATION CONTROLS FOR THE DISPLAY OR CONCEALMENT OF ADJACENT CONTENT, which application claims the benefit of, under 35 U.S.C. § 119(e), U.S. Provisional Patent Application No. 61/271,394, filed Jul. 20, 2009, which applications are incorporated herein by reference in their entireties.

BACKGROUND

Computerized information management is critical to managing all aspects of modern information and knowledge. Individuals now must make sense of vast amounts of important information without getting lost in the clutter of irrelevant information. Computerized information management can vastly improve many aspects of life, including medical research, financial management, education, and corporate accountability. These advances in research ultimately save lives and improve human understanding so that society can meet challenges from protecting the environment to improving public health.

Collecting and comparing information across information sources has always been difficult. When working with printed material or documents, comparing content in different documents is time-consuming and error-prone, requiring taking notes, marking pages for later comparison, "cut and paste" techniques, or flipping back and forth between two (or more) sources side by side. When working on a computer, especially important in the digital age, the reader typically must scroll within a document, often losing place, and jump from window to window to compare selected content between selected sources. None of these methods gives a person fast and easy access to exactly what is wanted if the information is spread out within a single source or across a collection of sources. What is needed is a system to collect and display information that enables the user to access information on a topic and read it coherently from across documents or from different locations within a document, ideally while allowing immediate access to surrounding content that may be required for further understanding.

SUMMARY

In one embodiment, disclosed is a computer-implemented method for designating identifier-associated sentences, distinguishing, by a computer system including an electronic processor and at least one operatively associated memory, one or more sentences of a data source, storing said one or more distinguished sentences in said memory, associating each of said one or more distinguished sentences with an identifier, said identifier being unique to each sentence, resulting in one or more corresponding identifier-associated sentences, storing said one or more identifier-associated sentences in said memory, and in response to receiving user input associated with a first identifier-associated sentence, designating a second identifier-associated sentence.

In one embodiment, disclosed is a computer-implemented method for designating identifier-associated sentences, distinguishing, by a computer system including an electronic processor and at least one operatively associated memory, one or more sentences of a data source, storing said one or more distinguished sentences in said memory, associating each of said one or more distinguished sentences with an identifier, said identifier being unique to each sentence, resulting in one or more corresponding identifier-associated sentences, storing said one or more identifier-associated sentences in said memory, formatting, in preparation for displaying on a display device, one or more controls comprising navigation elements, and in response to receiving user input in the computer system, said computer system designating at least one identifier-associated sentences.

In one embodiment, disclosed is a computer-implemented method for designating identifier-associated sentences, distinguishing, by a computer system including an electronic processor and at least one operatively associated memory, one or more sentences of a data source, storing said one or more distinguished sentences in said memory, associating each of said one or more distinguished sentences with an identifier, said identifier being unique to each sentence, resulting in one or more corresponding identifier-associated sentences, storing said one or more identifier-associated sentences in said memory, formatting, for display on a display device, one or more controls comprising navigation elements, transmitting said one or more controls comprising navigation elements for display on said display device, designating a first identifier-associated sentence, in response to receiving user input from said one or more controls comprising navigation elements, designating a second identifier-associated sentence, and displaying on said display device said first identifier-associated sentence and said second-identifier-associated sentence.

In one embodiment, disclosed is a computer-implemented method for designating identifier-associated sentences, distinguishing, by a computer system including an electronic processor and at least one operatively associated memory, one or more sentences of a data source, storing said one or more distinguished sentences in said memory, associating each of said one or more distinguished sentences with an identifier, said identifier being unique to each sentence, resulting in one or more corresponding identifier-associated sentences, storing said one or more identifier-associated sentences in said memory, and in response to receiving user input associated with a first identifier-associated sentence, designating a second identifier-associated sentence based on a predetermined relation between said first identifier-associated sentence and said second identifier-associated sentence.

In one embodiment, disclosed is a computer-implemented method for designating identifier-associated sentences, distinguishing, by a computer system including an electronic processor and at least one operatively associated memory, one or more sentences of a data source, storing said one or more distinguished sentences in said memory, associating each of said one or more distinguished sentences with an identifier, said identifier being unique to each sentence, resulting in one or more corresponding identifier-associated sentences, storing said one or more identifier-associated sentences in said memory, formatting, for display on a display device, one or more controls comprising navigation elements, and in response to receiving user input in the computer system, designating a second identifier-associated sentence based on a predetermined relation between a first identifier-associated sentence and said second identifier-associated sentence.

In one embodiment, disclosed is a computer-implemented method for designating identifier-associated sentences, distinguishing, by a computer system including an electronic processor and at least one operatively associated memory, one or more sentences of a data source, storing said one or more distinguished sentences in said memory, associating each of said one or more distinguished sentences with an identifier, said identifier being unique to each sentence, resulting in one or more corresponding identifier-associated sentences, storing said one or more identifier-associated sentences in said memory, formatting, for display on a display device, one or more controls comprising navigation elements, transmitting said one or more controls comprising navigation elements for display on said display device, in response to receiving user input from said one or more controls comprising navigation elements on said display device, designating a first identifier-associated sentence and a second identifier-associated sentence based on a predetermined relation between said first identifier-associated sentence and said second identifier-associated sentence, and displaying on said display device said first identifier-associated sentence and said second identifier associated sentence.

In one embodiment is disclosed a computer-implemented method for designating identifier-associated subunits, distinguishing, by a computer system including an electronic processor and at least one operatively associated memory, one or more subunits of a data source, storing said one or more distinguished subunits in said memory, associating each of said one or more distinguished subunits with an identifier, said identifier being unique to each subunit, resulting in one or more corresponding identifier-associated subunits, storing said one or more identifier-associated subunits in said memory, and in response to receiving user input associated with a first identifier-associated subunit, designating at least one identifier-associated subunit.

In one embodiment is disclosed a computer-implemented method for designating identifier-associated subunits, distinguishing, by a computer system including an electronic processor and at least one operatively associated memory, one or more subunits of a data source, storing said one or more distinguished subunits in said memory, associating each of said one or more distinguished subunits with an identifier, said identifier being unique to each subunit, resulting in one or more corresponding identifier-associated subunits, storing said one or more identifier-associated subunits in said memory, formatting, for display on a display device, one or more controls comprising navigation elements, and in response to receiving user input from said one or more controls comprising navigation elements, designating at least one identifier-associated subunit.

In one embodiment is disclosed a computer-implemented method for designating identifier-associated subunits, distinguishing, by a computer system including an electronic processor and at least one operatively associated memory, one or more subunits of a data source, storing said one or more distinguished subunits in said memory, associating each of said one or more distinguished subunits with an identifier, said identifier being unique to each subunit, resulting in one or more corresponding identifier-associated subunits, storing said one or more identifier-associated subunits in said memory, formatting, for display on a display device, one or more controls comprising navigation elements, transmitting to said display device data causing said one or more controls comprising navigation elements to be displayed on said display device, in response to receiving user input from said one or more controls comprising navigation elements, designating at least one of said identifier-associated subunits, and displaying on said display device at least one of said identifier-associated subunits.

In one embodiment is disclosed a graphical user interface for accessing a computer system, the computer system containing an electronic processor and at least one operatively associated memory, with one or more navigation controls programmed with instructions for receiving input data and for causing the computer system to transmit at least one identifier-associated subunit of a data source, said identifier of said identifier-associated subunit being unique to each subunit.

In one embodiment is disclosed a machine for designating user-identified subunits, the machine comprising a processor, in communication with at least one operatively associated memory, the processor programmed to distinguish one or more subunits of a data source, store said one or more distinguished subunits in said memory, associate each of said one or more distinguished subunits with an identifier, said identifier being unique to each subunit, resulting in corresponding identifier-associated subunits, store said one or more identifier-associated subunits in said memory, and, in response to receiving user input associated with a first identifier-associated subunit, designate a second identifier-associated subunit.

In one embodiment is disclosed a machine for designating identifier-associated subunits, the machine comprising a means for distinguishing one or more subunits of a data source, a means for storing said one or more distinguished subunits in said memory, a means for associating each of said one or more distinguished subunits with an identifier, said identifier being unique to each subunit, resulting in one or more corresponding identifier-associated subunits, a means for storing said one or more identifier-associated subunits in said memory, and a means for designating, in response to receiving user input associated with a first identifier-associated subunit, a second identifier-associated subunit.

In one embodiment is disclosed a computer-readable medium containing computer-executable instructions for designating identifier-associated subunits, the computer-readable medium comprising instructions for distinguishing one or more subunits of a data source, instructions for storing said one or more distinguished subunits in said memory, instructions for associating each of said one or more distinguished subunits with an identifier, each of said identifiers being unique to a respective subunit, resulting in one or more corresponding identifier-associated subunits, instructions for storing said one or more identifier-associated subunits in said memory, and instructions for designating, in response to receiving user input associated with a first identifier-associated subunit, a second identifier-associated subunit.

In one embodiment is disclosed a computer program product for designating identifier-associated subunits, the computer program product comprising instructions for distinguishing one or more subunits of a data source, instructions for storing said one or more distinguished subunits in a computer memory, instructions for associating each of said one or more distinguished subunits with an identifier, each of said identifiers being unique to a respective subunit, resulting in one or more corresponding identifier-associated subunits, instructions for storing one or more identifier-associated subunits in said memory, and instructions for designating, in response to receiving user input associated with a first identifier-associated subunit, a second identifier-associated subunit.

DRAWINGS

The utility of the embodiments of the invention will be readily appreciated and understood from consideration of the following description of the embodiments of the invention when viewed in connection with the accompanying drawings, wherein:

FIG. 2A shows an example of an article showing how subunits such as sentences from a data source can be distinguished.

FIG. 3 shows an example of a screen depicting a user input form.

FIG. 4 shows another example of a screen depicting a user input form.

Figure 5:
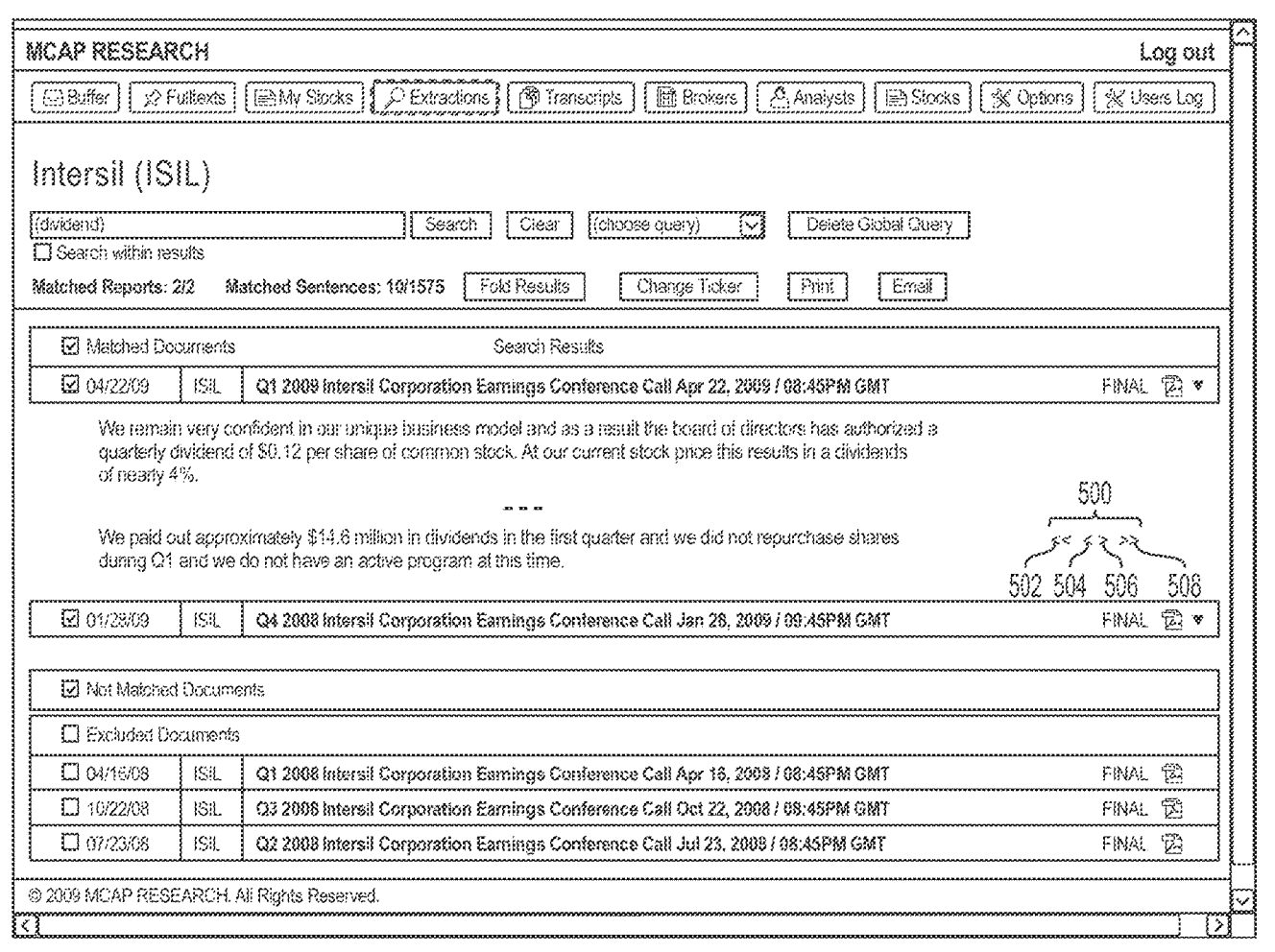

FIG. 5 shows another example of a screen depicting a user input form, as well as navigation controls.

FIG. 6 shows another example of a screen depicting a user input form, as well as navigation controls.

FIG. 7 shows another example of a screen depicting a user input form, as well as navigation controls.

FIG. 10 shows another example of a screen depicting a user input form, as well as navigation controls.

FIG. 11 shows another example of a screen depicting a user input form, as well as navigation controls.

FIG. 12 shows another example of a screen depicting a user input form, as well as navigation controls.

FIG. 13 shows another example of a screen depicting a user input form, as well as navigation controls.

FIG. 14 shows another example of a screen depicting a user input form, as well as navigation controls.

FIG. 17 illustrates how Javascript code can be used to implement some of the features of an embodiment of the invention.

DETAILED DESCRIPTION

Figure 1:
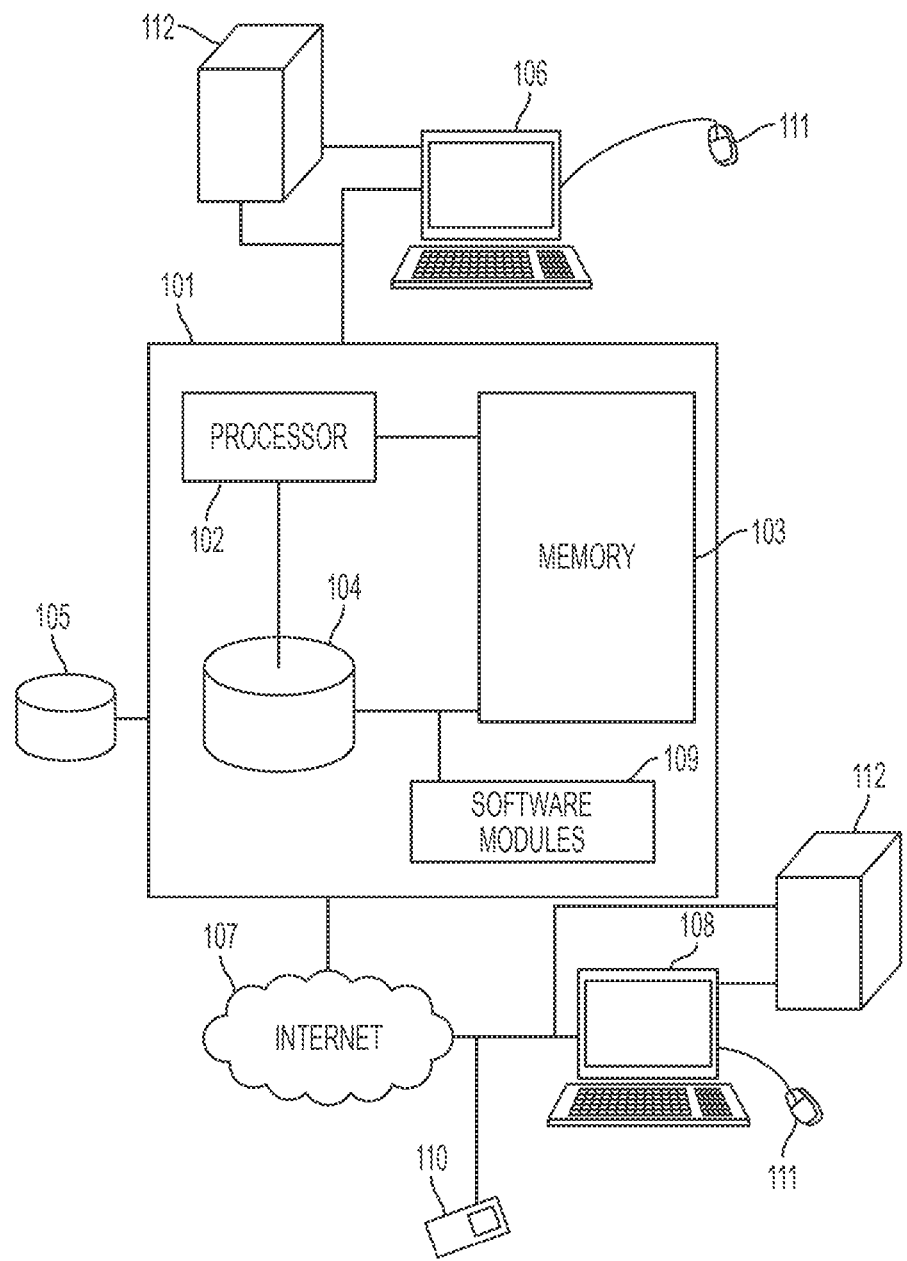
FIG. 1 shows a block diagram of a computer system architecture by which various embodiments of the invention may be implemented.

FIG. 1 shows a block diagram of a computer system by which various embodiments of the present invention may be implemented. It will be recognized that one of skill in the art can employ multiple architectures, components and interconnections with which to carry out embodiments of the present invention.

There is provided a configuration server 101 that can carry out numerous functions. It will be appreciated that there may be one or more electronically interconnected servers that carry out activities of configuration server 101, depending on the architecture and functionality desired. Further, configuration server 101 can comprise various modules for carrying out discrete computing tasks, and these modules may be located external to configuration server 101. Configuration server 101 comprises a processor 102, a memory 103 and a database 104 in which data, including text-based data, is stored. Again, there may be multiple processors, memories and databases in or associated with configuration server 101, and one or more of these, as the artisan will appreciate, may be located external to configuration server 101. Processor 102 can be a general-purpose processor or customized. For example, a database in which data is stored may be external database 105. Software modules 109 assist in carrying out various embodiments of the invention; as can be appreciated, given the modular nature of software implementation, the software may be provided within (or generally centralized within) configuration server 101, or may even be distributed proximate to or remote from it, in larger or smaller functional engines, as with cloud computing. In either instance-either where a user is architecturally proximate to the configuration server or communicates with it via the Internet-communication can flow in either direction, i.e., from the user toward the configuration server 101 and vice versa. Accordingly, FIG. 1 is illustrative only and the invention is not limited thereto.

Figure 1A:
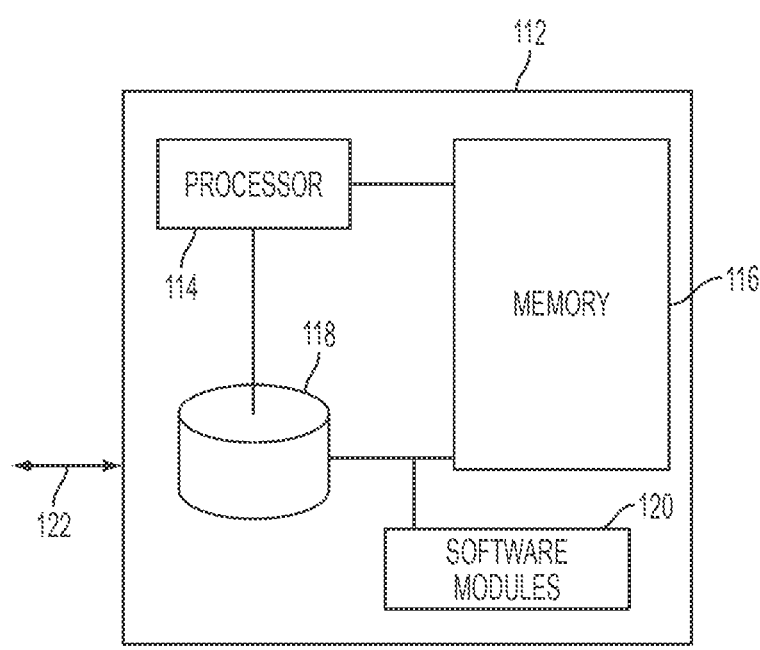
FIG. 1A shows a block diagram of a processing-capable device such as a PC or workstation that may be used in connection with various embodiments of the invention.

There is also provided a display 108 or a display 106 where a user, in electronic communication with configuration server 101, can view relevant processing activities on a display 108, 106 such as computer monitor. Display 106 may be architecturally proximate to configuration server 101, and a user may view configuration activities in such a manner. Or, a user at a display 108 can be in electronic communication with configuration server 101 where configuration information is transmitted from configuration server 101 through a network 107 such as the Internet. This would be the case for a user who is benefiting from various embodiments of the invention by Internet access, and as one of skill in the art will readily appreciate may be via processing unit 112 such as but not limited to a personal computer, workstation, laptop, or any other processing-capable device enabling a display (such as a handheld computing device 110 including but not limited to an iPhone®, BlackBerry® etc.) at work, at home, at an educational institution, and so on. Processing unit 112 itself will typically contain a processor 114, memory 116, database functionality 118, software modules 120, and input/output functionality, as depicted in FIG. 1A, and can carry out instructions to implement certain embodiments of the invention from configuration server 101 or may contain an instance of the software instructions to implement certain embodiments of the invention; it is known by those skilled in the art how to coordinate (if at all) carrying out instructions between configuration server 101 and PC 112 or other local processing device. The display 106 or 108 may be configured such that a user can interact with the display 106 or 108 by means of a computer "mouse" 111 or other device that accepts user input such that the user can interact with the content on the display 106 or 108. The user may use the mouse 111 to place a cursor on a desired portion of the screen and then "click" such that the user can submit input. There are other means to obtain user input, including but not limited to "mouseover" events. A "mouseover" (also called "rollover" or "hovering") event is one where, rather than input being based on a user's clicking on the mouse 111 or other input device, if a cursor is placed in an activation region on the display then "clickless" input is thereby given. Mouseover events may be associated with a computer language such as but not limited to Java or JavaScript. In addition, one of skill will appreciate that the user can also interact with display 106, 108 or 110 by means of touching it. This so-called "touchscreen" capability may be employed as well in the context of various embodiments of the invention.

Database 104 and/or database 105 may comprise a relational database. It may be based on another database model, such as object-oriented or hierarchical. These databases may contain among other things textual data that is processed according to various embodiments of the present invention. By way of non-limiting example, database 104 may include the following tables. There may be a Document Table, with each record in this table containing information about a document. The fields in the table may include: unique Document ID (numeric, auto-incremented), original ID or name provided by the source, file path (either the folder in the server or some URL), author, publisher's name, date published, and other domain specific metadata. A Full-text Table can be provided, that stores text format of each original source document. Thus, PDF files are converted into text and stored in this table. The fields of this table may include: Document ID (same as in the Document Table), Full-text ID (numeric, auto-incremented), method of converting to text (manual, or some particular commercial software (e.g., easyPDF)), date when full text was created, and a field relating to the actual text. There may be a Master Sentence Table. Data source subunits may comprise, by way of non-limiting example, sentences, images, drawings, figure captions, charts, titles, headings, or sub-headings.

Each sentence in a set of documents can be stored in its own record. The fields in this table may include: Document ID, Full-text ID, Sentence Number (sequential integers starting with 1, within a given document), and a field for the actual sentence. Other fields may be included, e.g., paragraph number. There may be a Collection Table. To understand the purpose of this table, assume that the end user has a document library for a particular domain of applications. The end user may select a relatively small number of documents for further analysis. This subset is referred to as a collection. The end user might have created different collections for different purposes. The Collection Table stores information about these collections. The fields in this table include: Collection ID (auto-incremented), Collection Name, Creation Date, Query used to create the collection, etc. The Collection Documents Table may store information about the list of documents in each of the collections created by the user. The fields in this table may include: Collection ID, Document ID. Also, there may be Collection-Specific Sentence Tables. For each collection, there may be a table of data elements such as sentences. These sentences are the ones in the documents in the given collection. These tables may have identical structures as the Master Sentence Table; in that sense, they may be copies from the Master Sentence Table.

In certain embodiments, the invention can be implemented on multiple platforms. A non-limiting example is by means of LAMP (Linux, Apache, MySQL, PHP/Perl). Further, JavaScript/Ajax or other programming languages can be used to enhance navigation efficiencies. In one example, JavaScript/Ajax can be attached to a navigational link on the web page. The JavaScript can find, from the web page, the displayed sentence's number and its document ID. From those inputs, JavaScript sends a request (e.g., using Ajax) to retrieve prior/next sentences. On the server side, PHP or any other server-side programming language may be used to make database queries. Once the data is retrieved from the database, the server program prepares it for display and may build, e.g., an HTML page in response to the original request.

Source Material

Various embodiments of the invention can handle diverse types of source materials including documents, articles, web-blogs, compilations, news articles, web pages, digitized books or any other textual material in digital form such that it can be stored and accessed by a computer or other electronic device. In general, a stand-alone source material is characterized by metadata elements which include author(s), date of publication, publisher, etc.

Source Material Subunits

One type of subunit of source material is a sentence. However, in general, additional types of embedded subunits can be identified including tables, figure captions, charts, titles, headings and sub-headings and other section markers. Embodiments of the invention need not be limited to textual materials, but can include drawings, images, photographs, sound or video data so long as it can be identified, indexed, and retrieved by reference to its identifier and displayed according to a specified relation (such as proximity or adjacency) to another identified subunit. An adjacency relation applies to sentences near the sentence of interest.

Sentence Source Identifier

An SSI is an address recognizable by a computing device that locates individual sentences or other types of subunits stored in a digital system. It can be built upon existing Uniform Resource Identifiers such as URLs. To implement, sentences are distinguished in a data source, and each sentence is associated with a unique identifier. Once earmarked, the sentences are identifier-associated sentences corresponding to the sentences in the data source but having a unique identifier.

Sentences Index

Figure 2:
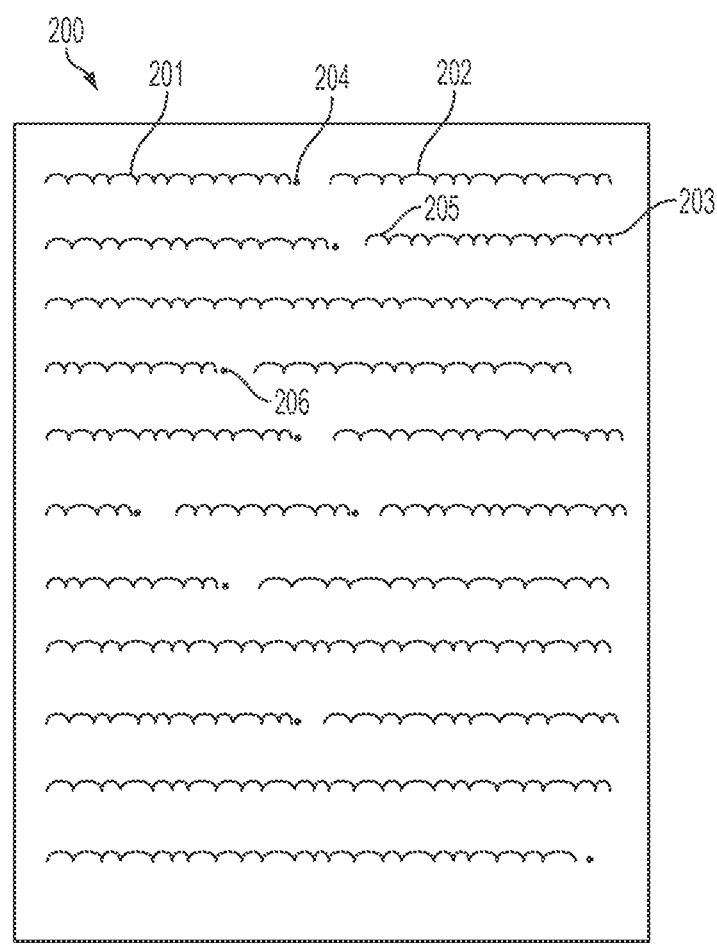
FIG. 2 shows an example of subunits, such as sentences, from a data source.

Sentences in the source material can be indexed with respect to that source material. For example in a news article, the sentences can be sequentially numbered from the first sentence to the last sentence in the article. An illustration of sequentially numbered sentences is shown in FIG. 2. This shows sentences from a data source 200. The first sentence 201 ends with a period 204. Successive sentences 202, 203 are shown. In one embodiment, the sequential numbering is added to the article's identifier (e.g., URL or metadata) and is generally transmitted with the sentence. The system uses SSIs to uniquely identify individual sentences that are stored in a digital form and retrieved as stand-alone entities, independent of their source material. Additionally, because the sentences in this example are indexed sequentially in the order that they appear in the article, context for each sentence can be provided as requested. Sentences with SSIs can be referred to as identifier-associated sentences.

Sentence Metadata

A sentence's metadata can include metadata inherited from its source document. Inherited metadata can include standard predefined metadata such as Generator, Title, Description, Subject, Keywords, Initial Creator, Creator, Printed By, Creation Date and Time, Modification Date and Time, Print Date and Time, Document Template, Automatic Reload, Hyperlink Behavior, Language, Editing Cycles, Editing Duration, and Document Statistics. In addition, the sentence metadata can include semantic, syntactic, or content tags. A tag assigned by a user can provide new metadata specific to that sentence. These additional metadata can be user-defined or automatically generated.

Subunits Association

Based on source material, subunits (e.g., sentences, paragraphs, text segments, captions, headings, drawings, images, and charts) can be indexed. A subunit can be distinguished in a data source. Each subunit can be associated with a unique identifier. Once earmarked, the subunits are identifier-associated subunits (IASU) corresponding to the subunits in the data source but having a unique identifier.

As a step of a method in accordance with various embodiments of the present invention, a unique identifier for each sentence or other subunit of interest in the source material is specified. The unique identifier can be assigned by a computer program or according to a data base in the system. Alternatively, the address of the computer or electronic device where the source material is digitally stored and the file path within the device can be used as the identifier; in the case of the Web, the URL of the source material can be used. Other global naming systems can be used, e.g., ISBN for books; or, a local naming system can be defined. Internet Protocol addresses can identify each host (computers, routers, switches, etc.) on a network.

In an optional further step, the system captures source material metadata (e.g., author name, document date, etc). This step is optional in accordance with certain embodiments.

In a further step, individual subunits within source materials are distinguished. (Except where a sequence is particularly prescribed, the sequence of steps in all methods described in the present application are not limited to the sequence in which they are presented, so long as functionality is maintained. The skilled artisan will recognize that step sequence is often a matter of design choice.)

In the case of sentences, they can be distinguished using sentence boundary disambiguation (SBD) techniques, as is known in the art. Once individual sentences are distinguished, they can be indexed, i.e., assigned unique identifications. The combination of the unique source identifier and a sentence's identifier within that source can provide a unique identifier for a sentence.

For example, consider the following article (which functions as a non-limiting example of the type of source material on which an embodiment of the invention can operate) at http://finance.yahoo.com/news/Stocks-rally-anew-on-more-apf-791335492.html?x=0 The URL can be used as a unique identifier of the article. The article, which can be seen in FIG. 2A, includes the following content and is stored in the system.

Computer-based instructions in configuration server 101 and/or in processing unit 112, shown in FIG. 1, and/or in other computing devices in communication thereto (not shown) as one of skill in the art can appreciate, process the article such that each individual sentence of the article is distinguished. In the above example 12 sentences are distinguished, as schematically indicated by the numbering within square brackets. Note that in the example shown, the heading, subheading, and authors' names, etc., are not identified as sentences because they do not include a period followed by a capital letter. Alternative SBD systems can be devised that would identify and index headings and subheadings.

Each sentence distinguished (or each distinguished sentence of interest) is assigned a unique identifier within that document. That is, in this example, the sentences of interest are indexed from 1-12, as seen in FIG. 2A in 220, 222, 224, 225, 226, 228, 230, 232, 234, 236, 238 and 240. Once the sentences are indexed, they can be reordered or reconfigured according to a desired relation. For example, in a system in accordance with an embodiment of the present invention, an end user could first request from the article (which is the source data for this example) all identifier-associated sentences containing the word "gain" (and word derivatives), 226 and 236 (indexed [4] and [10] in FIG. 2A.) Then, the user may request for IAS's immediately succeeding sentences 226 and 236. In the example shown in FIG. 2A, that request would designate sentences 225 and 238 (indexed as [5] and [11] in FIG. 2A). Similarly, a user may start with all identifier-associated sentences containing the word "future" shown as 228 and 234 (indexed as [6] and [8] in FIG. 2A). Then the user may request IAS's immediately preceding these identifier-associated sentences and sentences 225 and 232 (indexed as [5] and [7]) would be designated. The example is merely illustrative; sentences or subunits can be returned according to any desired relation. Note that FIG. 2A includes an un-indexed sentence between sentence 228 and sentence 230 ([6] and [7] in the index); embodiments of the invention do not necessarily require that all sentences or other subunits of source material be indexed.

The system creates a record for each sentence. The records may be stored in database 104 and/or 105, and/or in communication with processing unit 112 such as but not limited to a PC. Functionality from a database 104 or 105 may overlap with that of memory 103 or 116, or vice versa, as can be appreciated, because both involve memory. Thus, herein the use of database functionality alone or in combination with memory functionality may be described as "storage" or "memory." The fields may include: The source identifier, the sentence index, SSI, the actual sentence, and metadata (author, date, headline, paragraph number). The fields can be customized according to the user's needs. It can be appreciated that data structure approaches besides indexing may be used in order to associate the subunits and/or sentences with a unique identifier.

A user can access a record through his/her computing device using a graphical user interface (GUI). Specifically, the user interacts with display 106, 108 or 110 as appropriate. Further description below assumes that one of these has been selected for use.

Figure 3:
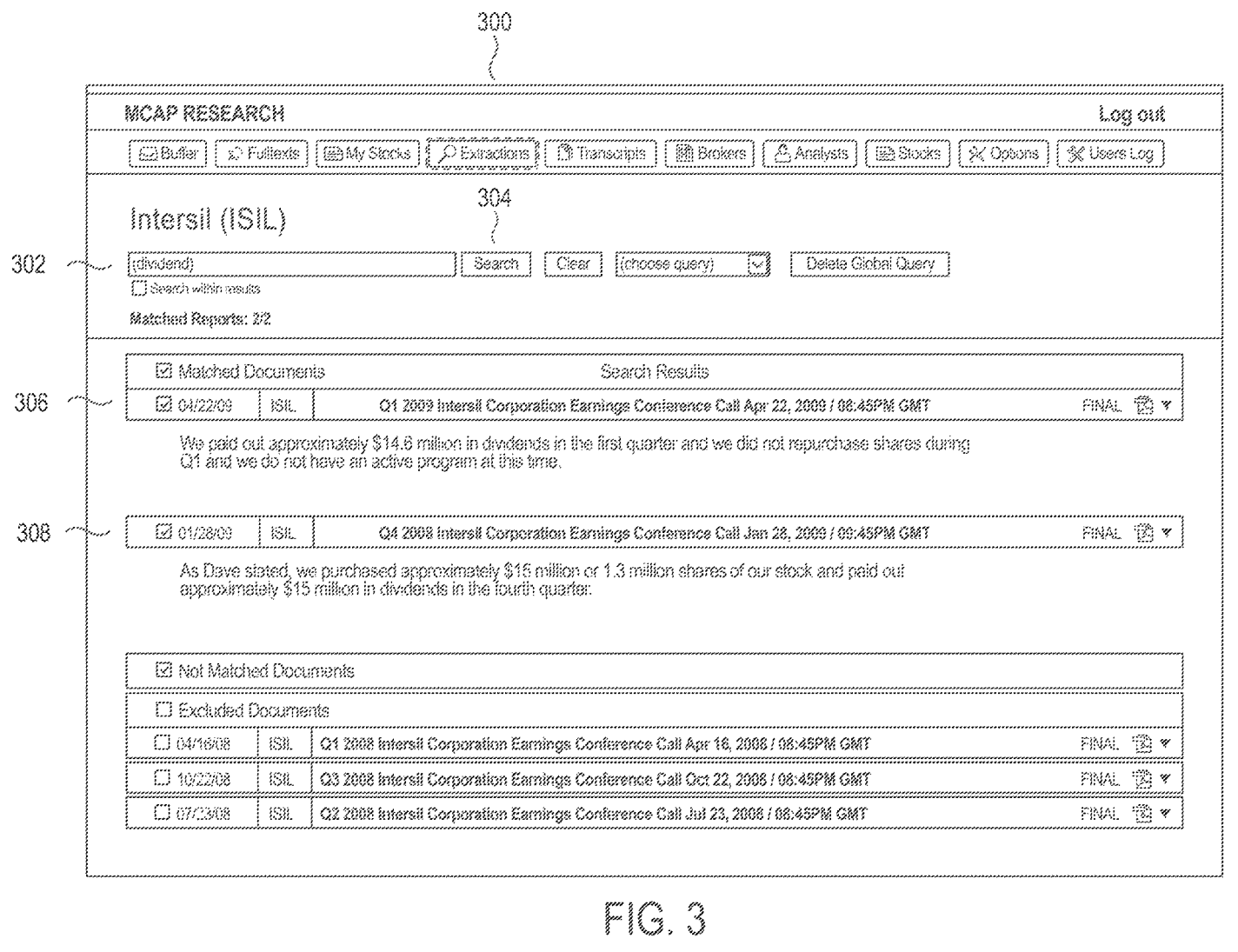

Use of an input form in accordance with one embodiment of this invention will now be discussed. The user is shown an input form on the display. The input form may have the format of input form 300, as shown in FIG. 3. The input form has a search box 302 in which the user can type in a phrase or word of interest.

The user clicks a submit button 304 which retrieves, from storage, individual sentences which contain the phrase or word, along with the SSI information. The SSI information is typically not displayed.

When a plurality of sentences is retrieved, the system utilizes the SSI to organize the display of the results according to configurable criteria. For example, results can be presented in chronological order, or by author.

Typically the display shows the source of the retrieved sentence, as shown in FIG. 3, where labels 306 and 308 identify separate sources (in this example, reports of two different conference calls). Some subset of the document metadata may be used to create a heading that indicates the source of the material and that is part of the display to the remote user. The heading typically indicates the specific document from which the sentences are retrieved, presented in a user-friendly manner.

Retrieved sentences can be displayed in an order consistent with their order within the source material, as shown in FIGS. 3-14. If retrieved sentences come from the same paragraph of source material, they can be grouped together for display. If there are intervening sentences that are not retrieved, the gap can be indicated by ellipsis marks. Alternatively, space or other visual indicators can be used to indicate the gap. Other unretrieved material from the paragraph, including initial and final sentences, can be indicated by the various markers and include the possibility of no indication at all.

If retrieved sentences come from different paragraphs of source material and those paragraphs are not sequential, the missing paragraph(s) can be indicated by a marker, as shown by dashes 400 in FIG. 4.

If retrieved sentences come from different paragraphs of source material and the paragraphs are sequential, the sentences can be displayed with a blank line (space) between them. Other forms of indicating the relation between the displayed sentences will be apparent to the skilled artisan, and are comprehended in various embodiments of the invention.

Existing art does not allow a finer universal identification (locating) level within a document using existing URL or ISBN in the case of books (metadata).

An embodiment of the current invention allows a finer identification level within a document by adding indexes that uniquely specify sentences of the document such as sentences. "Index" is used herein to mean giving a unique identifier to, e.g., a sentence, that facilitates information retrieval. Paragraphs and other document subunits can also be given unique identifiers and indexed. In one embodiment, this is achieved by first ensuring that the document is in text (.txt) format. For instance, if the document is in PDF format, extraction software such as Jade from BCL technologies can be used to convert it to text format.

Once the document (source material) is in text format, individual sentences can be distinguished. The skilled artisan will be aware of many approaches to sentence disambiguation (determining sentence boundaries), as for instance SBD in the field of natural language processing (NLP) applications. For example, a period followed by a capitalized word can define sentence boundaries (with exceptions such as abbreviations and common names). The following is one example of an approach to locate the end of a sentence:
  (a) If there is a period, it ends a sentence.
  (b) If the preceding token is on my hand-compiled list of abbreviations, then the period doesn't end a sentence.
  (c) If the next token is capitalized, then the period ends a sentence.

This strategy gets about 95% of sentences correct.

Another example of an approach is to automatically learn a set of rules from a set of documents where the sentence breaks are pre-marked. Solutions have been based on a maximum entropy model. The SATZ architecture uses a neural network to disambiguate sentence boundaries and achieves 98.5% accuracy.

In other embodiments, optical character recognition (OCR) or scanning can be used directly to identify sentences boundaries.

Other approaches to SBD are found at other sources, including
  nlp.stanford.edu/courses/cs224n/2003/fp/huangy/final_project.doc
  http://nlp.stanford.edu/courses/cs224n/2003/fp/huangy/
  flwww.eecs.berkeley.edu/Pub s/TechRpts/1994/6317.html
  www.mt-archive.info/MTS-2001-Walker.pdf
  http://www.aclweb.org/anthology-new/A/A97/A97-1004.pdf Once sentence boundaries are identified, the document (source material) may be broken into individual sentences. These individual sentences can be indexed by assigning an identifier to each sentence. These sentence identifiers can be derived from or can form a component of the enhanced metadata. Indexed sentences can be stored in a record. The data base record includes fields to store the enhanced metadata.

For World Wide Web pages, the following is an example of one embodiment of the invention. The World Wide Web comprises web pages; a server on an enterprise network can be used to store/cache sentences in the documents of interest to the enterprise; unique ID's for the sentences in the web pages on the Internet can then be assigned; a stand alone (non-networked) server/computer may be used to store the sentences of interest to a user.

Sentence Navigation

Given a displayed sentence, a sentence navigation bar is provided that displays one or more additional sentences based on a defined relation between the displayed sentence and the additional sentences. For example, the defined relation could be between the displayed sentence and the first sentence of the paragraph within which the displayed sentence appears. Alternatively, the defined relation could be between the displayed sentence and its immediately preceding or immediately succeeding sentence.

The person having skill in the art will recognize that numerous relations can be defined within the scope of the invention. For example, the relation can be between the displayed sentence and all the sentences in its paragraph, the relation can be between the displayed sentences and the first sentence of the source document. Each relation can be associated with an icon that gets triggered by an event (e.g., actions performed by a user such as a mouse click). Generally, if $A_1, A_2, \ldots, A_n$ are sets, we can define a relation as a subset of the Cartesian product $A_1 \times A_2 \times \ldots A_n$. In various embodiments of the present invention, the elements of the sets can be, but are not limited to, sentences or other subunits. The sets can be, but are not limited to, source documents, web pages, paragraphs, or other data objects such as tables or image objects.

In an embodiment according to the present invention, the computer system will designate sentences based on relations, as discussed above. The designated sentences can be retrieved, displayed, and/or stored by the computer system, among other purposes that will be apparent to the person having skill in the art. E.g., given an initial sentence and a specific relation of interest such as "sentence immediately following", the computer system will designate (locate or find) the sentence(s) that meet the criteria of the relation. After designation in this example, in next steps the computer system can display or store (as non-limiting examples) the designated sentences or other subunits.

The relation can be predetermined, as for example, when the system returns results that meet criteria of a relation. In an alternative, artificial intelligence and other techniques can be used such that the relation evolves in response to sequential user inputs, as, for example, the system "sensing" that a user desires or could benefit from a different relation.

Numerous relations can be defined. For example, the relation can be between the displayed sentences and all the sentences in its paragraph; the relationship could be between the displayed sentences and the first sentence of the source document. Each relation can be associated with an icon that gets triggered by an event (e.g., actions performed by a user when visiting a web page such as a mouse click, or other user input).

As a starting point for describing the sentence navigation bar in more detail, assume that the server in the system has sent to the browser an XHTML page. In accordance with various embodiments of the present invention, the XHTML page contains sentences, unique identification of the sentence, and other metadata for that sentence.

Interactive Sentences:

Since each sentence of interest has it own unique identifier, each individual sentence displayed on the web page can be made to respond to user actions (e.g., using JavaScript).

In one embodiment, retrieved sentences are displayed as a web page in a browser window, as shown in FIG. 5. A mouseover event on a displayed sentence displays a sentence navigation bar 500. (The navigation bar is not shown in FIGS. 3 and 4, but is shown in FIG. 5-14, with the navigation bar components discussed more particularly with reference to FIG. 5, however the discussion could apply to functionality disclosed in FIGS. 6-14 as well.) An event on a navigation bar, such as a mouse click, mouse over, or touch on a touch screen, bar causes additional sentences to be displayed. It will be understood that "clicking" in the description herein can also indicate input such as a mouse click, mouse over, or touching on a touch screen.

Figure 6:
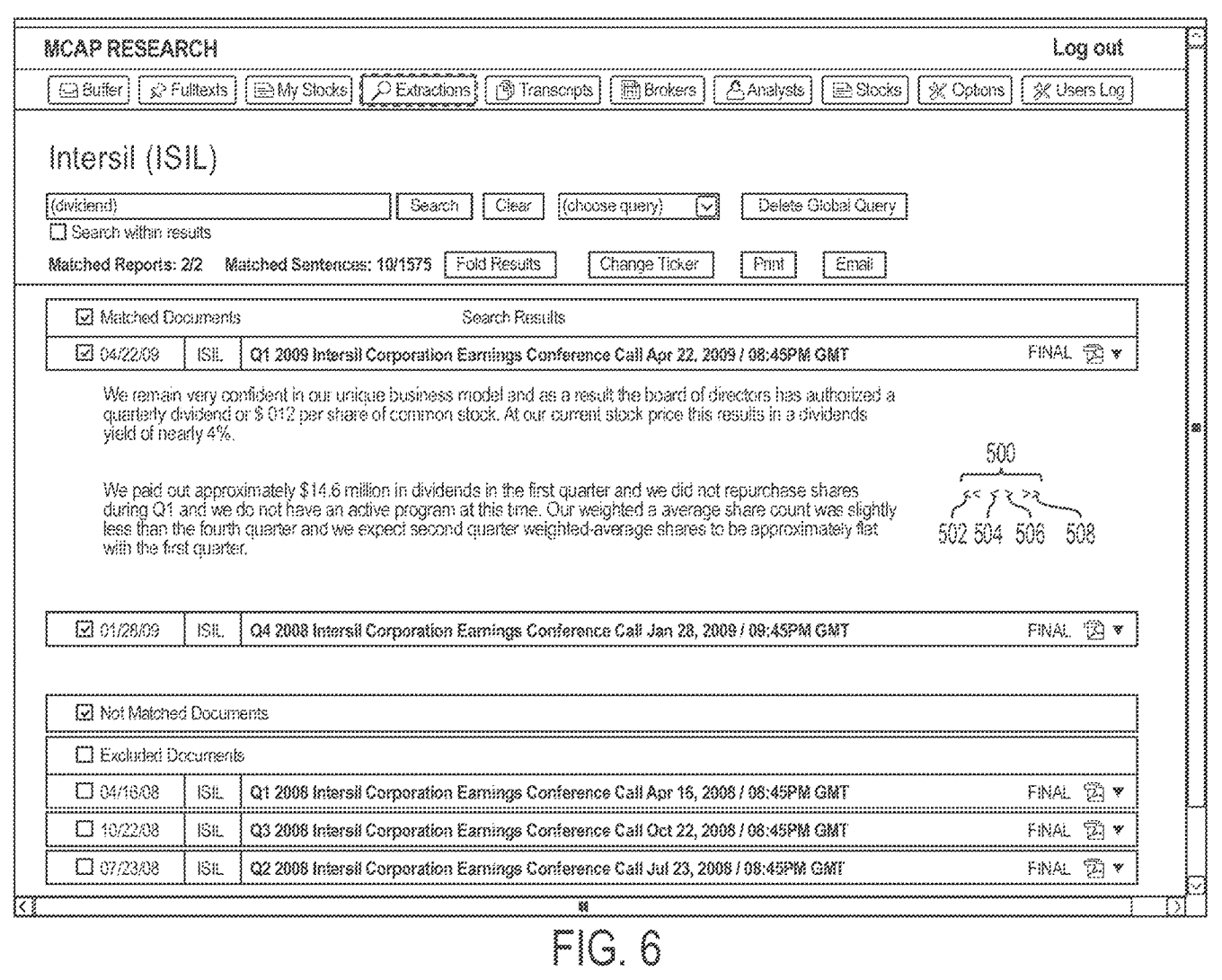

The mouse-click event on the sentence navigation bar actually occurs on an element within that bar. In one embodiment, elements on the sentence navigation bar appear as indicator marks (in one convention, "less-than" and "more-than" symbols). The sentence navigation bar can be seen in FIGS. 5-14. The sentence navigation bar 500 comprises indicator marks 502, 504, 506 and 508. Smaller increments are indicated by single symbols; greater increments are indicated by double symbols. (Other embodiments also include smaller and greater decrements; for convenience of discussion, the term "increment" can include decrements.) From the sentences shown in FIG. 5, clicking on element 506 displays the sentence that immediately follows, in the source document, the initially displayed sentence, as shown in FIG. 6 (i.e., the result of clicking on 506 in FIG. 5 is shown in FIG. 6). Alternatively, other configurations can be displayed according to a user-defined relation between sentences.

Figure 7:
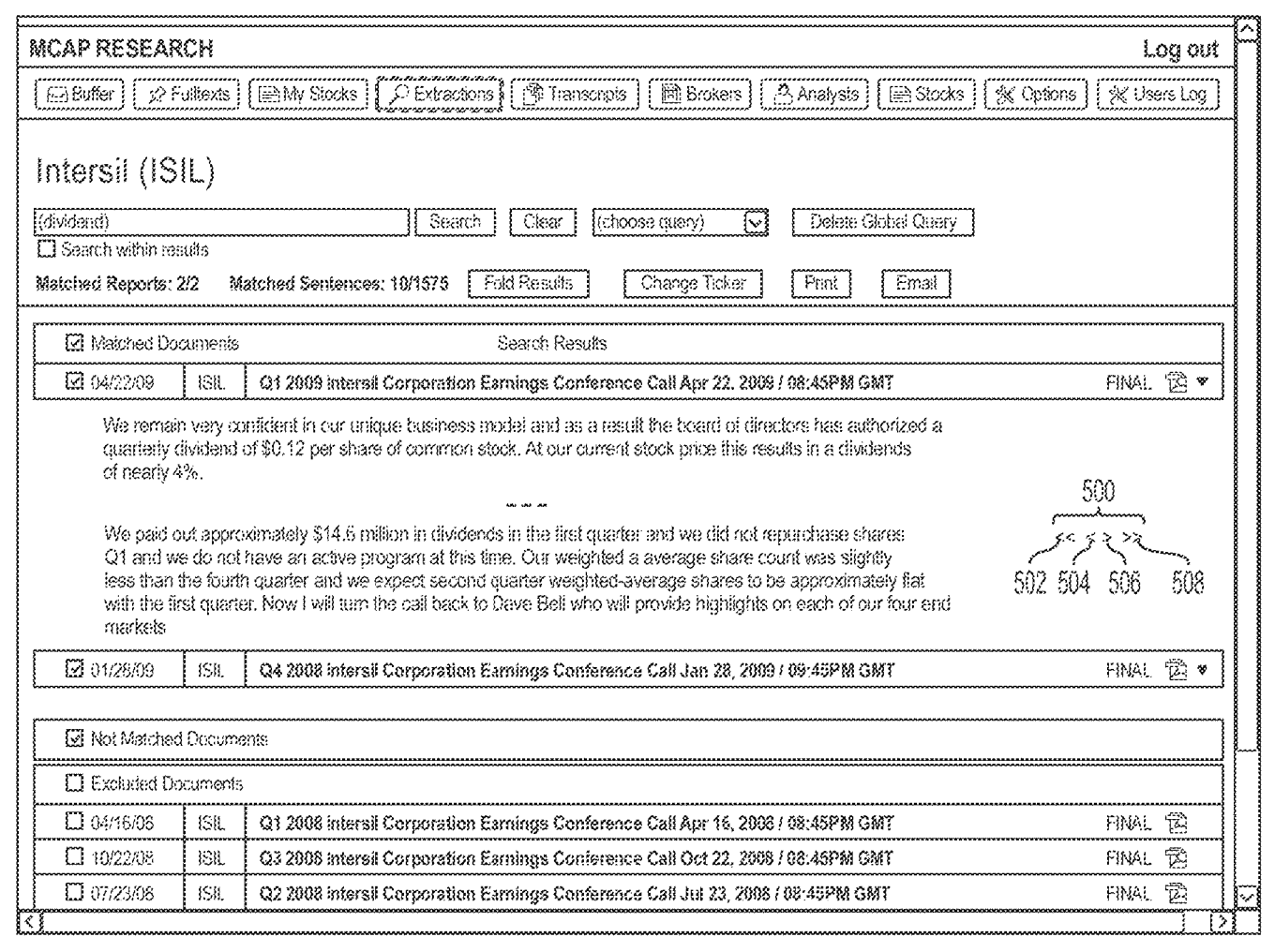

From the sentences shown in FIG. 6, again clicking on element 506 displays the sentence that immediately follows, in the source document, the displayed sentence, as shown in FIG. 7 (i.e., the result of clicking on 506 in FIG. 6 is shown in FIG. 7).

Figure 8:
FIG. 8 shows another example of a screen depicting a user input form, as well as navigation controls.

Similarly, clicking on 504 will bring the immediately preceding sentence, as depicted in FIGS. 7 and 8. From the sentences shown in FIG. 7, clicking on element 504 displays the immediately preceding sentence in the source document, as shown in FIG. 8 (i.e., the result of clicking on 504 in FIG. 7 is shown in FIG. 8).

Figure 9:
FIG. 9 shows another example of a screen depicting a user input form, as well as navigation controls.

From the sentences shown in FIG. 8, again clicking on element 504 displays the immediately preceding sentence in the source document, as shown in FIG. 9 (i.e., the result of clicking on 504 in FIG. 8 is shown in FIG. 9).

Figure 11:
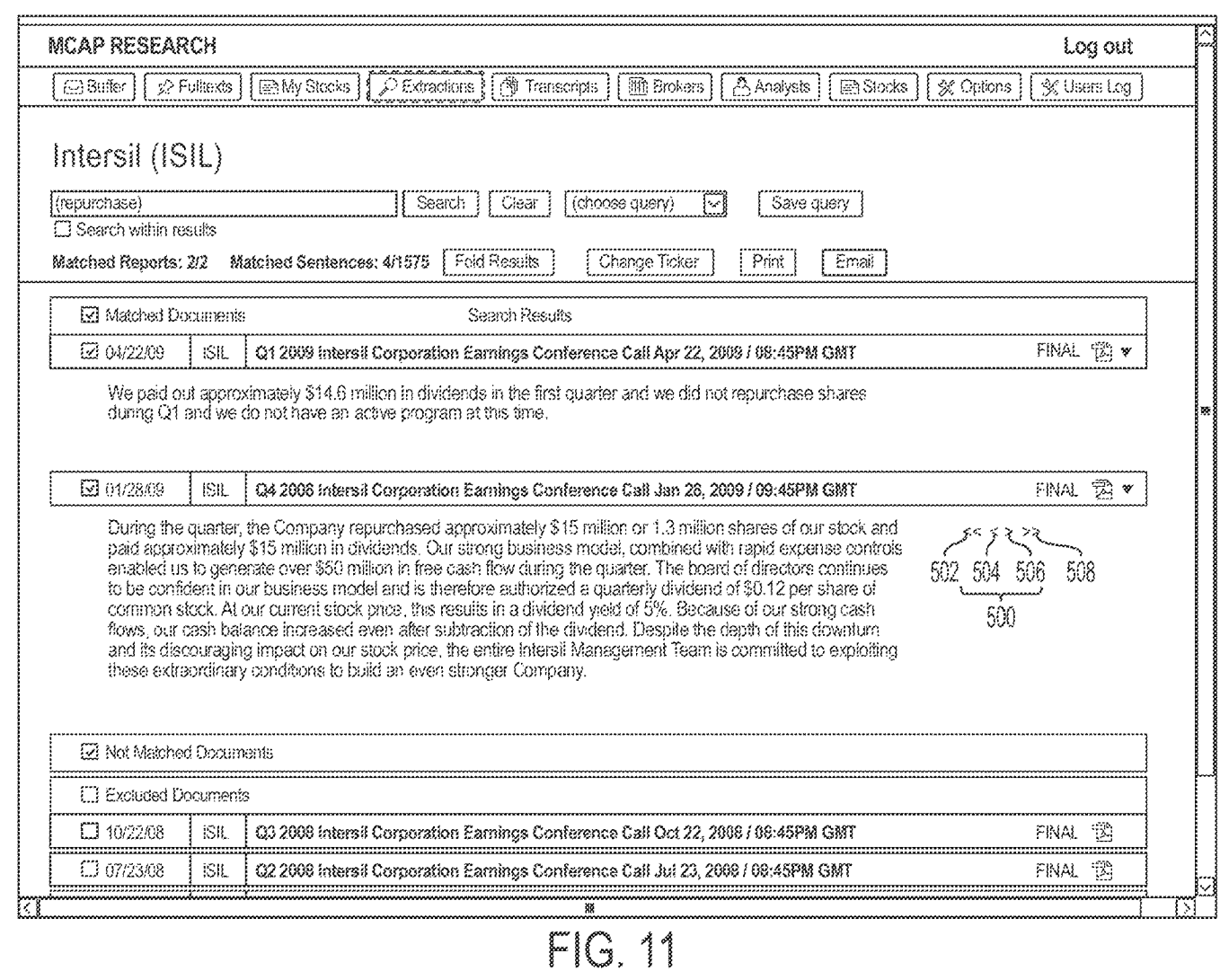

Clicking on double indicator 508 will, in one click, bring the sentences following to the end of the paragraph, as depicted in FIGS. 10 and 11. The result of clicking on 508 in FIG. 10 is shown in FIG. 11.

Figure 12:
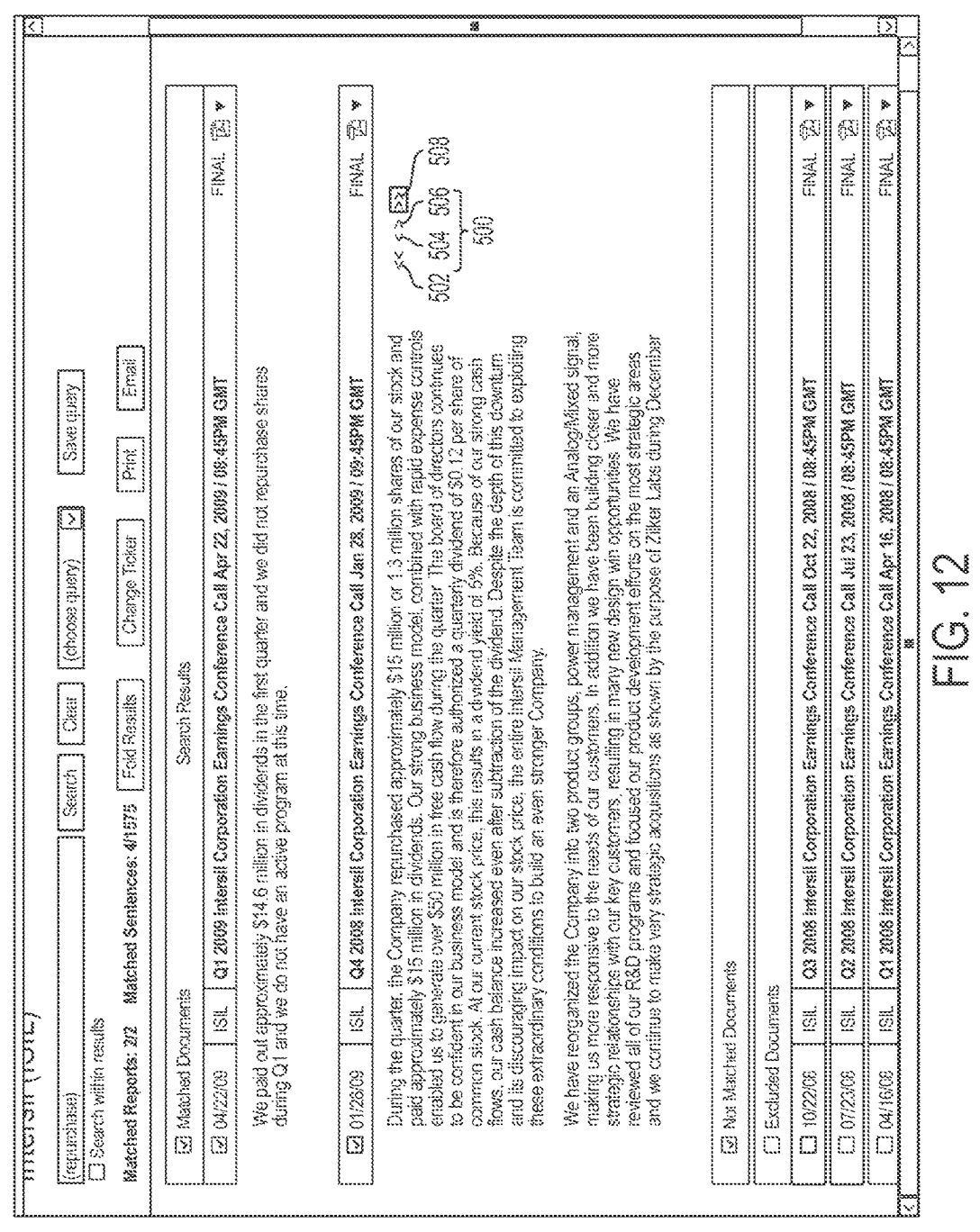

After initially clicking on 508 to complete the paragraph, subsequent clicks can display entire following paragraphs. From the sentences shown in FIG. 11, clicking on element 508 displays the immediately following paragraph in the source document, as shown in FIG. 12 (i.e., the result of clicking on 508 in FIG. 11 is shown in FIG. 12).

Figure 13:
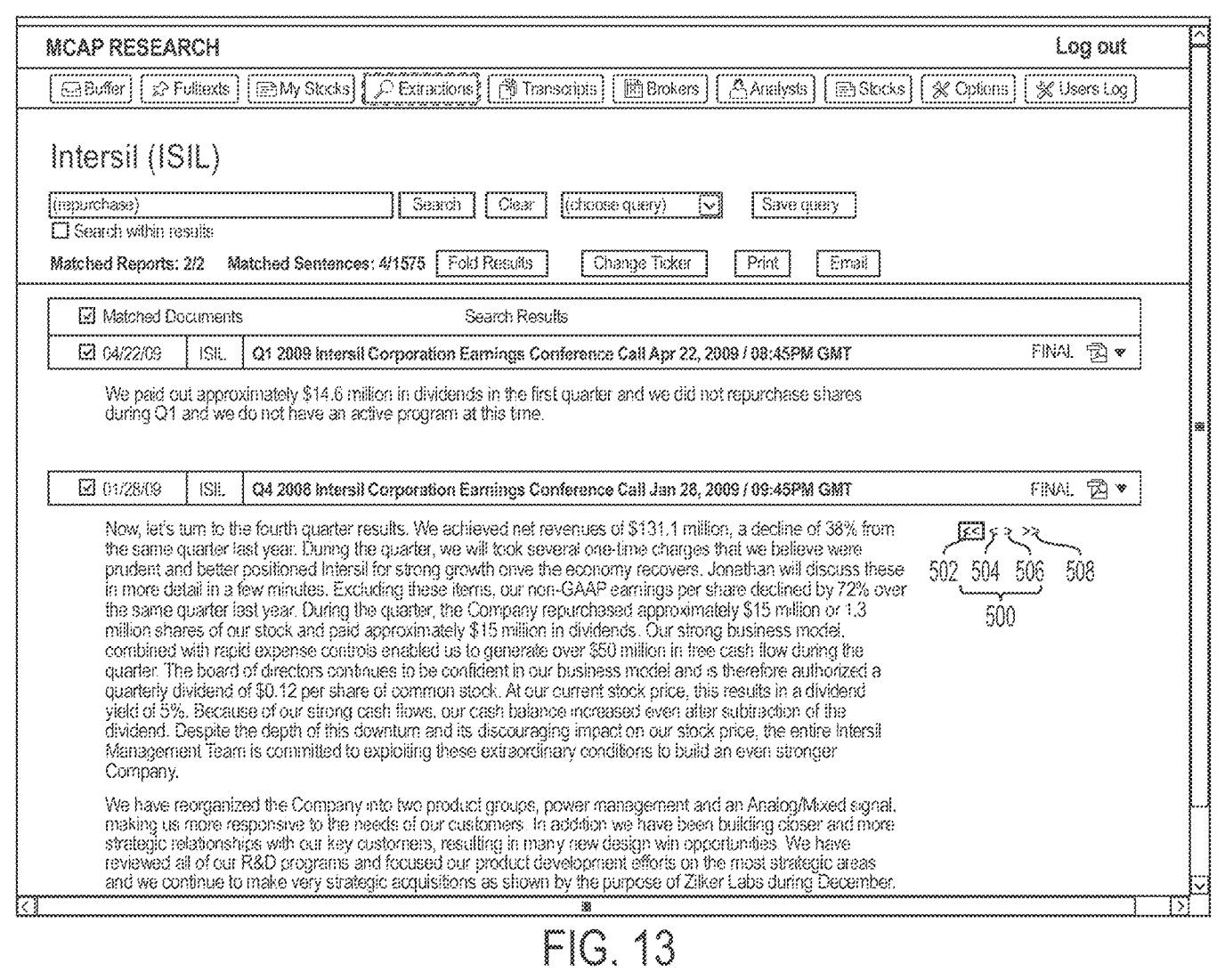

Clicking on double indicator 502 will, in one click, bring all the preceding sentences within the same paragraph. From the sentences shown in FIG. 12, clicking on element 502 displays the immediately preceding sentences within that paragraph in the source document, as shown in FIG. 13 (i.e., the result of clicking on 502 in FIG. 12 is shown in FIG. 13).

Figure 14:
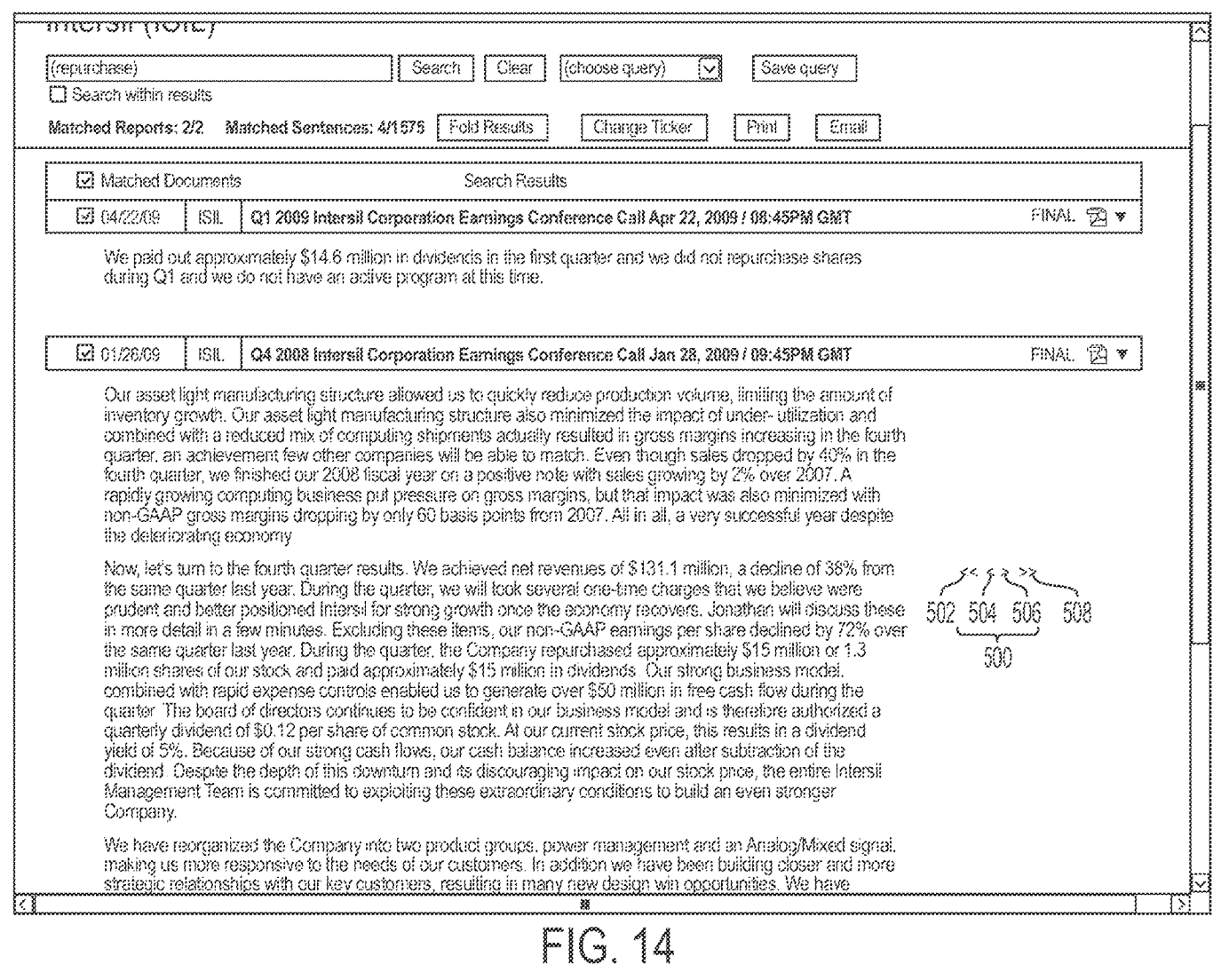

After initially clicking on 502 to complete the paragraph, subsequent clicks can display entire preceding paragraphs. From the sentences shown in FIG. 13, clicking on element 502 displays the immediately preceding paragraph in the source document, as shown in FIG. 14 (i.e., the result of clicking on 502 in FIG. 13 is shown in FIG. 14).

Color can be used in embodiments of the invention. The colors can illustrate the relationship between keyword searched (which, for example, can be shown in red), originally displayed sentences (which can be shown in black with the keyword in red), and incrementally displayed sentences, which can be shown in green. The distinctions could be indicated in other ways, as for example by typeface or size, or by other use of color.

Because sentences are indexed, the user can define relations between those sentences such that navigation tools can be implemented for display and navigation of user-selected relations between individual sentences. For example, a sentence navigation bar could be displayed that allows the user to display a sentence of interest along with the first sentence of the paragraph in which it occurs. As will be apparent from the previously described capability, additional sentences can be added to that first sentence of the paragraph. Sentences can also be added to the originally displayed sentence.

This allows a user to dynamically sculpt a context for a displayed sentence of interest. Such dynamic sculpting allows a user to exercise his or her particular expertise or focus to select exactly those sentences that form a context that suits his or her needs.

The use of sentences as the basis for both original and incremental display is a fundamental unit of context-building and coherence. Sentences are the smallest units that can reliably express a complete thought, and thus when indexed form an index of complete thoughts. Using fragments or snippets as the unit of storage and retrieval would not be as effective because fragments and snippet are not units defined around a thought—they are typically defined in terms of a keyword and a desired number of surrounding words. There is no guarantee that a retrieved snippet will contain a thought or an idea, let alone a complete thought or idea. In contrast, a sentence, because of its grammatical structure and its connection to the structure and function of human thought processes, as has been described by, for example, Noam Chomsky, is much more likely to do so.

Various embodiments of the present methods and systems can be defined around complete ideas as captured by natural language sentences. There is a semantic relationship between sentences, but there is no reliable semantic relationship between snippets or fragments.

There is no cohesion between snippets or fragments of text in the way there is between sentences. For example, even an unsophisticated user can decide that two sentences complement each other, support each other, contradict each other, or elaborate. This is not reliably possible with text fragments defined by arbitrary length (arbitrary number of words or characters).

The sentence navigation bar is interactive such that when an event (such as mouse click or touch screen selection) occurs, instructions are executed that display one or more additional sentences on the display. A sentence navigation bar defines a particular mapping between a displayed sentence and other sentences in the source document. For example, user selection can cause the sentence navigation bar to display the next sequential IAS or the immediately preceding IAS from the source material.

Displayed sentences can also be deleted, whether they are originally displayed or subsequently added. Any displayed sentence can be removed by a user-triggered event.

For instance, a program can be set up to be executed so that double-clicking on a displayed sentence removes it (for example, from HTML) so that it is no longer displayed. Similarly, a user can define events that remove more than one sentence. For example, a displayed paragraph could be removed by a specified user-triggered event, which could be clicking on a defined region associated with the paragraph, or could be clicking on a dedicated icon.

Figure 15:
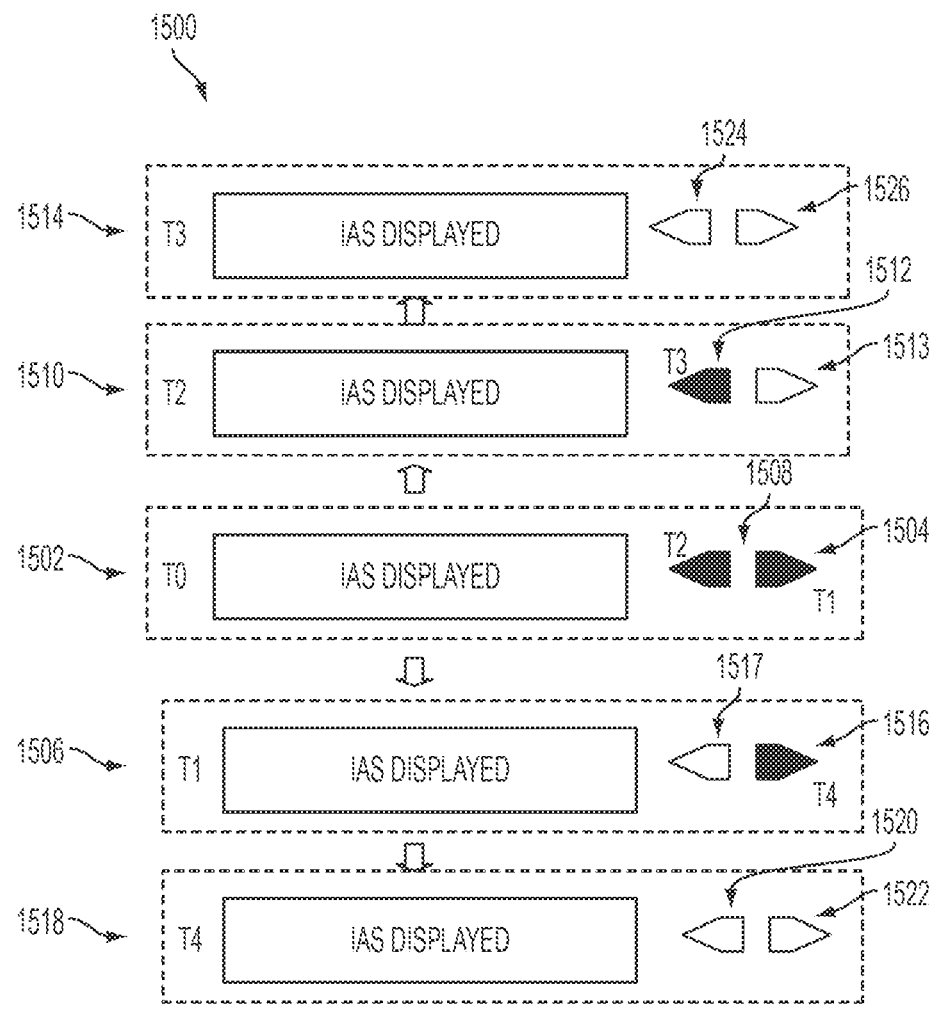
FIG. 15 depicts a temporal sequence of actions and displayed results on a user input form involving selected navigational control elements.

FIG. 15 depicts a temporal sequence 1500 of actions and displayed results involving selected navigational control elements and associated displayed sentences, generally illustrating display flexibility in accordance with an embodiment of the present invention.

A temporal sequence element 1502 depicts an identifier-associated sentence (IAS) along with associated navigation controls 1504 and 1508, displayed at a time T0. The IAS displayed at time T0 can have been retrieved by a user query or provided by any other means, such as in response to a predefined alert, or by subscription, or communicated by a client, coworker or other entity.

Navigation controls 1504 and 1508 are associated with sequence element 1502 at T0, as depicted in FIG. 15. Navigation symbol 1504 schematically represents the navigation symbol that, when invoked, causes a next succeeding IAS (the IAS that, in the data source, most immediately succeeds the IAS displayed at T0) to be displayed, while navigation symbol 1508 schematically represents the navigation symbol that, when invoked, causes an immediately preceding IAS (the IAS that, in the data source, most immediately precedes the IAS displayed at T0) to be displayed.

At a time T1, where T1>T0, navigation control 1504 is invoked, and a resulting IAS is displayed in temporal sequence element 1506 along with corresponding navigation controls 1516 and 1517. (In FIG. 15, invocation of navigation controls is indicated by shading the control symbols.) For illustrative purposes, in this example, the activation of the navigation control and the display of the resulting IAS and associated navigation controls are identified as being displayed at T1; most often, the associated display will occur within a fraction of a second of when the navigation control is invoked, although system and other delays could increase the time discrepancy.

At a time T2, where T2>T1, navigation control 208 is invoked. The IAS associated with the invocation is displayed as a result 1510, along with navigation controls 1512 and 1513 for the IAS of 1510. When invoked, navigation control 1512 acts to display the IAS most immediately preceding the IAS displayed at T2 and depicted in result 1510. Similarly, when invoked, navigation control 1513 acts to display the IAS most immediately following the IAS displayed at T2 and depicted in result 1510; since that IAS is already displayed (in sequence 1502) invocation of 1513 would not show any change in the display. In FIG. 15, navigation control 1524 has not been invoked, as shown by the fact that it is not shaded.

At a time T3, where T3>T2, navigation symbol 1512 is invoked, as generally depicted by the shading of element 1512, and this causes a result 1514 to be displayed. Result 1514 includes an IAS that is the sentence immediately preceding, in the data source, the IAS of step 1510 at T2.

Invocation of navigation symbol 1516 occurs at a time T4, where T4>T3, as schematically depicted by the shading of element 1516. The function selected at 1516 acts to display the next succeeding identifier-associated sentence in the data source, shown in FIG. 15 at a result 1518. Result 1518 also includes navigation controls 1520 and 1522, neither of which has been invoked in this example. Also shown for purposes of clarity are un-invoked navigation controls 1520 and 1522 of result 1518.

The entirety of FIG. 15 may be displayed on a single screen, window, or other display. In one embodiment, invoking a navigation control does not remove previously displayed material, including control elements, from display. In alternatives, material can be displayed sequentially rather than simultaneously, and the system can be configured to display only selected elements of interest.

Those skilled in the art will recognize that the temporal sequence and results can be widely varied. As generally demonstrated in FIG. 15, a multiplicity of distinct action/result temporal sequences can be performed by the user. Although FIG. 15 displays only five sentences and corresponding control sets, many more can be displayed.

For all displayed sentences, static navigation controls have been shown. However, the system and method also allow for dynamic navigation controls, as for example where hovering over a displayed identifier-associated sentence displays associated navigation symbols.

The form or configuration of the navigation symbols is not crucial so long as they are functional for the user to make selections or invoke the control element. Invocation or selection can be by clicking, tapping, a mouse event such as or single or double clicking or mouseover, data entry, keystroke, touchscreen or other touch, or any other invocation or selection mechanism.

In terms of the control elements, as control elements, words or character strings within the sentence may be used. For example, the last word of the sentence can be used as a control link such that, when it is invoked, it displays the immediately following sentence in the data source. Similarly, the first word of the sentence can be used as a control element such that when it is invoked (as, for example, by touch or mouse event), it displays the immediately preceding sentence in the data source.

In FIG. 15, the navigation controls are shown on the right margin next to each other. As is apparent to those skilled in the art, the specific positioning of the navigation elements is not critical so long as they are discoverable and can be conveniently invoked. The elements can be positioned above, below, on the left, to the right, or the elements can be split and not next to each other, or may even be contained on another device.

The navigation control icons can be generally arrow-shaped, as shown in FIG. 15, or can be directional line markings, ellipses where a series of dots indicate further material and the location within the data source of the further material. Navigation controls can further be any understandable "widget." Direction and other relations can be indicated by color.

Embodiments of the present invention may further contemplate multi-sentence navigation controls that act to display more than one sentence simultaneously.

Figure 16:
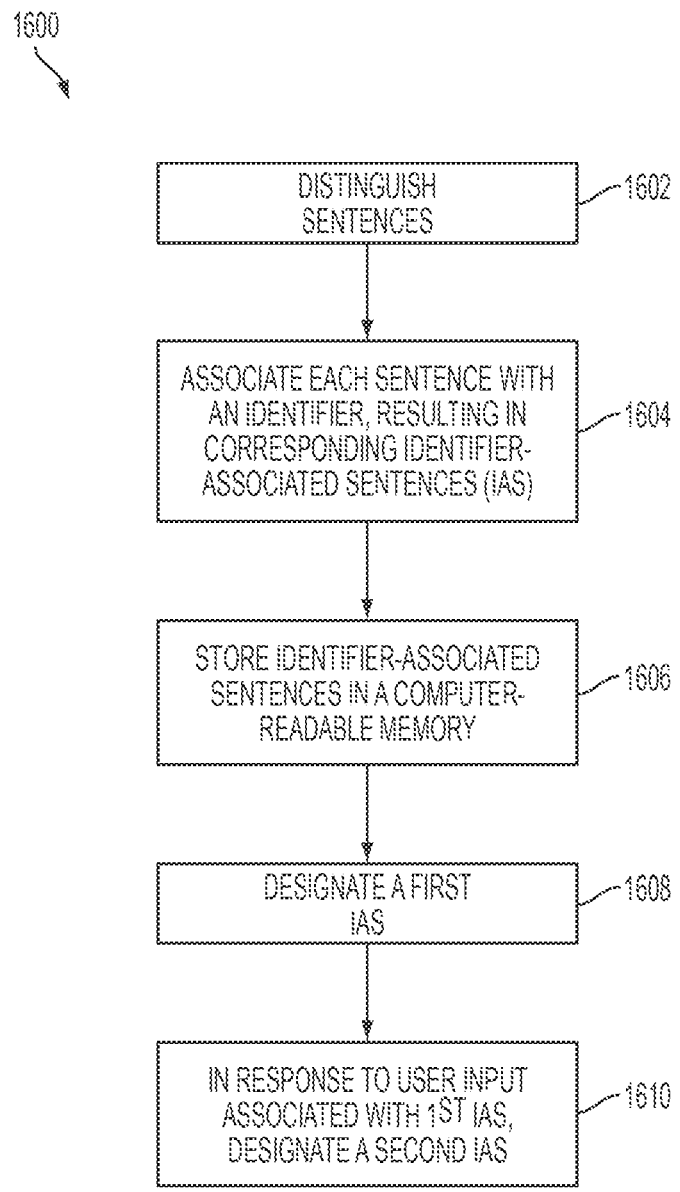
FIG. 16 depicts a flow chart of a method in accordance with various embodiments of the present invention.

FIG. 16 shows a flow chart of a computer-implemented method 1600 in accordance with an embodiment of the present invention. At a step 1602, a computer system distinguishes sentences. At a step 1604, the computer system associates distinguished sentences with corresponding unique identifiers, resulting in identifier-associated sentences. At a step 1606, identifier-associated sentences are stored in a computer-readable memory. At a step 1608, the computer system distinguishes a first identifier-associated sentence. At a step 1610, in response to user input associated with the first identifier-associated sentence, the computer system designates a second identifier-associated sentence.

Figure 16A:
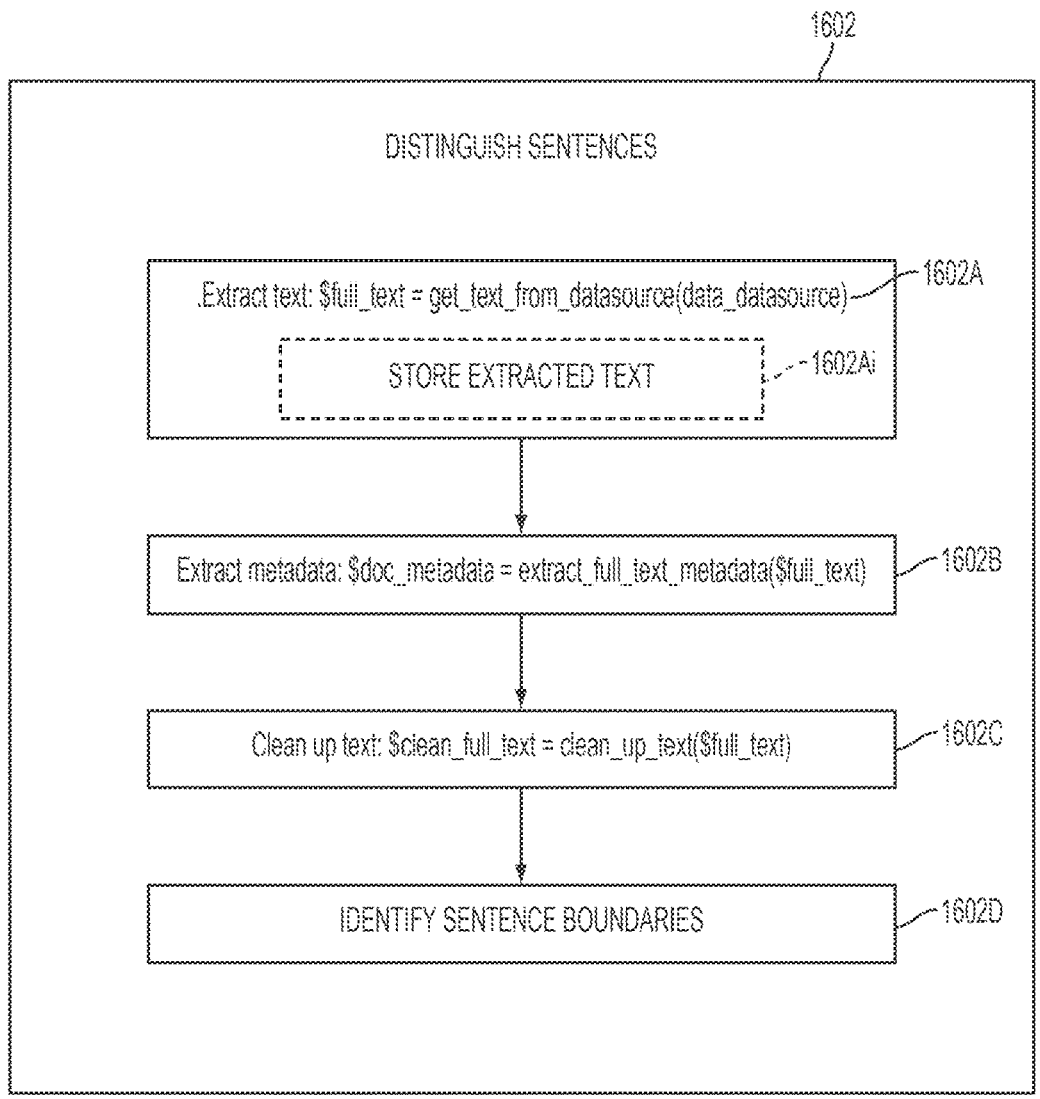
FIG. 16A shows substeps of a step of the flow chart of FIG. 16.

FIG. 16A shows an exemplary step of the computer-implemented method of FIG. 16, including substeps. At step 1602, a computer system distinguishes sentences. In a substep 1602A of step 1602, text is extracted. In a substep 1602Ai, the extracted text is optionally stored, as indicated by the dashed lines. In a substep 1602B, metadata from the extracted text is extracted. In a substep 1602C, the text is cleaned up. Substep 1602D identifies boundaries.

FIG. 17 shows a snippet of a Javascript to illustrate how an embodiment of the system could respond to a user input, such as a click to an element on a users screen. When a user clicks on a navigation element on a screen the computer system executes the function "addSentenceToPage(sentenceID, operation)".

In this illustration, a sentence identification as well as the specific type of operation requested by the users are passed on to the system. For instance, the requested operation can be 'prev' which would stand for 'immediately preceding sentence'. The ID of the designated sentence resulting from that operation is obtained. Then the actual text of the sentence (the words) are retrieved using, in this example, AJAX. This resulting sentence is then displayed on the user's screen. A server side program can be used to create the necessary HTML and CSS (Cascading Style Sheet) codes for the results to be formatted and displayed on the user's screen.

In the preceding specification various embodiments and aspects of the present invention have been described with reference to specific examples thereof. It will, however, be evident that various modifications and changes may be made without departing from the broader spirit and scope of the present invention as set forth in the claims that follow. The specification and drawings are accordingly to be regarded in an illustrative rather than restrictive sense.

What is claimed is:

1. A computer-implemented method for designating identifier-associated subunits, the computer-implemented method comprising:
   distinguishing, by a computer system including an electronic processor and at least one operatively associated memory, a plurality of subunits of a data source;
   storing said plurality of distinguished subunits in said memory;
   associating each of said plurality of distinguished subunits with an identifier, said identifier being unique to each subunit, resulting a plurality of corresponding identifier-associated subunits;
   storing said plurality of identifier-associated subunits in said memory;
   receiving a user search query;
   displaying, in response to the user search query, a first identifier-associated subunit, the first identifier-associated subunit containing a response to the search result;
   displaying, in response to the user search query, a second identifier-associated subunit, the second identifier-associated subunit also containing a response to the search result;
   displaying a plurality of navigation controls, each control associated with a displayed identifier-associated subunit;
   displaying, in response to receiving a first user navigation request associated with the first identifier-associated subunit, a previously undisplayed third identifier-associated subunit, the third identifier associated subunit being the identifier associated subunit immediately succeeding, in the data source, the first identifier-associated subunit and, upon its initial display, the third identifier-associated subunit displayed simultaneously with the first and second identifier-associated subunit;
   displaying, in response to receiving a second user navigation request associated with the second identifier-associated subunit, a previously undisplayed fourth identifier-associated subunit, the fourth identifier-associated subunit being the identifier associated subunit immediately succeeding, in the data source, the second identifier-associated subunit and, upon incrementally displaying, in response to a user navigation request, one or more previously undisplayed identifier-associated subunits which are further associated with one of the displayed identifier-associated subunits based on a defined relation, wherein an additional identifier-associated subunit is displayed in response to each additional user navigation request, the further identifier-associated subunits displayed simultaneously with the previously displayed identifier-associated subunits.

2. The computer-implemented method of claim 1, wherein said incrementally displaying, in response to a user navigation request, one or more identifier-associated subunits comprises displaying an identifier-associated subunit immediately succeeding, in said data source, the one of the displayed identifier-associated subunits.

3. The computer-implemented method of claim 1, wherein said incrementally displaying, in response to a user navigation request, one or more identifier-associated subunits comprises displaying an identifier-associated subunit immediately preceding, in said data source, the one of the displayed identifier-associated subunits.

4. The computer-implemented method of claim 1, wherein said incrementally displaying, in response to a user navigation request, one or more identifier-associated subunits comprises displaying a last subunit in a paragraph containing the one of the displayed identifier-associated subunits.

5. The computer-implemented method of claim 1, wherein said incrementally displaying, in response to a user navigation request, one or more identifier-associated subunits comprises displaying a first subunit in a paragraph containing the one of the displayed identifier-associated subunits.

6. The computer-implemented method of claim 1, wherein said incrementally displaying, in response to a user navigation request, one or more identifier-associated subunits comprises displaying the first subunit in a paragraph immediately following a paragraph containing the one of the displayed identifier-associated subunits.

7. The computer-implemented method of claim 1, wherein said incrementally displaying, in response to a user navigation request, one or more identifier-associated subunits comprises displaying a paragraph immediately following a paragraph containing the one of the displayed identifier-associated subunits.

8. The computer-implemented method of claim 1, wherein said incrementally displaying, in response to a user navigation request, one or more identifier-associated subunits comprises displaying an identifier-associated subunit that is a predetermined number of identifier-associated subunits from the one of the displayed identifier-associated subunits.

* * * * *